United States Patent [19]
Hurley et al.

[11] Patent Number: 5,883,145
[45] Date of Patent: Mar. 16, 1999

[54] CROSS-LINKED FOAM STRUCTURES OF POLYOLEFINS AND PROCESS FOR MANUFACTURING

[75] Inventors: Robert F. Hurley, Centerville; Matthew L. Kozma, Osterville, both of Mass.; Kurt A. Feichtinger, Saratoga Springs, N.Y.

[73] Assignee: Sentinel Products Corp., Hayannis, Mass.

[21] Appl. No.: 805,686

[22] Filed: Feb. 25, 1997

Related U.S. Application Data

[63] Continuation of Ser. No. 308,801, Sep. 19, 1994, abandoned.

[51] Int. Cl.⁶ .................................................. C08F 210/00
[52] U.S. Cl. ............................ 521/144; 521/79; 521/82; 525/63; 525/64; 525/70; 525/191; 264/45.7; 264/45.9; 264/232; 264/239
[58] Field of Search ............................... 521/144, 79, 82; 525/63, 64, 70, 191; 264/45.7, 45.9, 232, 239

[56] References Cited

U.S. PATENT DOCUMENTS

| | | |
|---|---|---|
| 2,254,203 | 9/1941 | Bender . |
| 2,387,730 | 10/1945 | Alderson . |
| 2,450,436 | 10/1948 | McIntire . |
| 2,515,250 | 7/1950 | McIntire . |
| 2,740,157 | 4/1956 | McCurdy et al. . |
| 2,988,777 | 6/1961 | Bieber et al. . |
| 3,067,147 | 12/1962 | Rubens et al. . |
| 3,098,831 | 7/1963 | Carr . |
| 3,098,832 | 7/1963 | Pooley et al. . |
| 3,238,565 | 3/1966 | Jacobs . |
| 3,287,477 | 11/1966 | Vesilind . |
| 3,335,892 | 8/1967 | Hildreth . |
| 3,338,864 | 8/1967 | Megall et al. . |
| 3,346,686 | 10/1967 | Collins . |
| 3,379,802 | 4/1968 | Raley . |
| 3,396,062 | 8/1968 | White . |
| 3,399,098 | 8/1968 | Omoto et al. . |
| 3,413,387 | 11/1968 | Ohsol . |
| 3,413,388 | 11/1968 | Lux et al. . |
| 3,431,163 | 3/1969 | Gilbert . |
| 3,431,164 | 3/1969 | Gilbert . |
| 3,539,473 | 11/1970 | Simpson et al. . |
| 3,565,243 | 2/1971 | Freeman . |
| 3,639,304 | 2/1972 | Raley, Jr. . |
| 3,644,230 | 2/1972 | Cronin . |
| 3,645,155 | 2/1972 | Robinson .................................. 83/663 |
| 3,645,992 | 2/1972 | Elston .................................. 260/80.78 |
| 3,646,155 | 2/1972 | Scott . |
| 3,651,183 | 3/1972 | Hosoda et al. . |
| 3,711,584 | 1/1973 | Sagane et al. . |
| 3,743,611 | 7/1973 | Muroi et al. . |
| 3,755,208 | 8/1973 | Ehrenfreund . |
| 3,804,684 | 4/1974 | Tokushige et al. . |
| 3,808,300 | 4/1974 | Miyamoto et al. . |
| 3,814,779 | 6/1974 | Wiley . |
| 3,886,100 | 5/1975 | Yasuda et al. . |
| 3,936,518 | 2/1976 | Soda et al. . |
| 3,938,661 | 2/1976 | Carmody . |
| 3,949,028 | 4/1976 | Murakami et al. . |
| 3,953,558 | 4/1976 | Hatano et al. . |
| 3,954,929 | 5/1976 | Hoenke . |
| 3,959,189 | 5/1976 | Kitamori . |
| 3,960,784 | 6/1976 | Rubens . |
| 3,965,054 | 6/1976 | Nojiri et al. ....................... 260/2.5 HA |
| 3,966,381 | 6/1976 | Suh . |
| 3,976,530 | 8/1976 | Callan . |
| 4,048,275 | 9/1977 | Usamoto et al. . |
| 4,053,341 | 10/1977 | Kleiner et al. ........................... 156/798 |
| 4,058,583 | 11/1977 | Glander et al. ....................... 264/176 R |
| 4,076,698 | 2/1978 | Anderson et al. .................... 526/348.6 |
| 4,080,344 | 3/1978 | Ikeda et al. . |
| 4,102,720 | 7/1978 | Kaneko et al. . |
| 4,102,829 | 7/1978 | Watanabe et al. ......................... 521/81 |
| 4,117,195 | 9/1978 | Swarbrick et al. ...................... 428/379 |
| 4,126,598 | 11/1978 | Reighter . |
| 4,142,956 | 3/1979 | Shikinami et al. . |
| 4,146,598 | 3/1979 | Coyne . |
| 4,160,072 | 7/1979 | Shinkai et al. ............................. 521/86 |
| 4,163,085 | 7/1979 | Kuhnel et al. . |
| 4,168,353 | 9/1979 | Kitamori . |
| 4,181,647 | 1/1980 | Beach . |
| 4,181,762 | 1/1980 | Benedyk .................................... 428/97 |
| 4,182,398 | 1/1980 | Salyer et al. ................................ 165/1 |
| 4,203,815 | 5/1980 | Noda et al. .......................... 204/159.2 |
| 4,209,473 | 6/1980 | Coyne . |
| 4,211,590 | 7/1980 | Steward et al. . |
| 4,215,202 | 7/1980 | Park . |
| 4,225,650 | 9/1980 | van Brederode et al. . |
| 4,226,946 | 10/1980 | Park et al. ........................... 521/988.5 |
| 4,228,255 | 10/1980 | Fujimoto et al. . |
| 4,234,531 | 11/1980 | Jocteur . |
| 4,241,832 | 12/1980 | Bliss . |
| 4,247,651 | 1/1981 | Ohno et al. . |
| 4,275,023 | 6/1981 | Shimizu et al. . |

(List continued on next page.)

FOREIGN PATENT DOCUMENTS

| | | |
|---|---|---|
| 451864 | 10/1948 | Canada . |
| 0 584 927 A2 | 3/1994 | European Pat. Off. . |

*Primary Examiner*—Duc Truong
*Attorney, Agent, or Firm*—Fish & Richardson P.C.

[57] ABSTRACT

New cross-linked polymeric foam compositions, and methods for making the same, are provided. The new compositions utilize novel cross-linked polyolefin copolymers and show improvements in strength, toughness, flexibility, heat resistance and heat-sealing temperature ranges as compared to conventional low density polyethylene compositions. The new compositions also show processing improvements over linear low density polyethylene. The novel polyolefins, which are essentially linear, comprise ethylene polymerized with at least one alpha-unsaturated C3 to C20 olefinic comonomer, and optionally at least one C3 to C20 polyene, and exhibit, in an uncross-linked sense, a resin density in the range of about 0.86 g/cm3 to about 0.96 g/cm3, a melt index in the range of about 0.5 dg/min to about 100 dg/min, a molecular weight distribution in the range of from about 1.5 to about 3.5, and a composition distribution breadth index greater than about 45 percent.

32 Claims, No Drawings

U.S. PATENT DOCUMENTS

| | | |
|---|---|---|
| 4,303,756 | 12/1981 | Kajimura et al. . |
| 4,303,757 | 12/1981 | Kajimura et al. . |
| 4,308,352 | 12/1981 | Knaus . |
| 4,333,898 | 6/1982 | Schmidtchen .................... 264/45.9 |
| 4,347,329 | 8/1982 | Park . |
| 4,370,378 | 1/1983 | Zabrocki et al. . |
| 4,379,859 | 4/1983 | Hirosawa et al. . |
| 4,389,514 | 6/1983 | Schmidle et al. .................. 525/364 |
| 4,399,087 | 8/1983 | Akiyama et al. . |
| 4,429,059 | 1/1984 | Ozutsumi et al. . |
| 4,433,029 | 2/1984 | Senda et al. . |
| 4,435,346 | 3/1984 | Ito et al. . |
| 4,440,703 | 4/1984 | Akiyama et al. . |
| 4,443,393 | 4/1984 | Akiyama et al. . |
| 4,444,948 | 4/1984 | Hochstrasser ........................ 525/61 |
| 4,446,254 | 5/1984 | Nakae et al. . |
| 4,448,901 | 5/1984 | Senda et al. . |
| 4,464,425 | 8/1984 | Voigt et al. ............................ 428/35 |
| 4,473,665 | 9/1984 | Martin-Vvedensky et al. . |
| 4,504,534 | 3/1985 | Adachi et al. . |
| 4,510,031 | 4/1985 | Matsumura et al. . |
| 4,515,907 | 5/1985 | McCullough et al. . |
| 4,526,930 | 7/1985 | Keogh ................................. 525/105 |
| 4,542,164 | 9/1985 | Nishioka et al. . |
| 4,554,293 | 11/1985 | Park .................................... 521/81 |
| 4,581,383 | 4/1986 | Park .................................... 521/91 |
| 4,591,606 | 5/1986 | Bergstrom .......................... 521/79 |
| 4,592,468 | 6/1986 | Wallace . |
| 4,605,682 | 8/1986 | Park . |
| 4,633,361 | 12/1986 | Ela et al. . |
| 4,640,933 | 2/1987 | Park . |
| 4,652,588 | 3/1987 | Park . |
| 4,663,361 | 5/1987 | Park . |
| 4,666,946 | 5/1987 | Fudge . |
| 4,692,471 | 9/1987 | Fudge . |
| 4,694,025 | 9/1987 | Park . |
| 4,694,027 | 9/1987 | Park . |
| 4,702,868 | 10/1987 | Pontiff et al. ......................... 264/50 |
| 4,709,817 | 12/1987 | Keady et al. . |
| 4,714,716 | 12/1987 | Park . |
| 4,725,492 | 2/1988 | Yazaki et al. ...................... 428/317.7 |
| 4,739,547 | 4/1988 | Tanaka et al. . |
| 4,759,992 | 7/1988 | Tomko et al. ...................... 428/447 |
| 4,762,860 | 8/1988 | Park . |
| 4,767,814 | 8/1988 | Bae et al. ............................ 524/284 |
| 4,791,143 | 12/1988 | Tanaka et al. . |
| 4,791,147 | 12/1988 | Tanaka et al. . |
| 4,818,789 | 4/1989 | Tomko et al. ....................... 525/64 |
| 4,824,059 | 4/1989 | Butler . |
| 4,837,272 | 6/1989 | Kelley ................................ 525/59 |
| 4,850,913 | 7/1989 | Szabad, Jr. . |
| 4,868,044 | 9/1989 | Tanaka et al. . |
| 4,870,111 | 9/1989 | Donuiff et al. ...................... 521/60 |
| 4,873,042 | 10/1989 | Topcik ............................... 264/211.24 |
| 4,908,166 | 3/1990 | Salyer . |
| 4,918,111 | 4/1990 | Tanaka et al. . |
| 4,937,284 | 6/1990 | Bergstrom ........................... 525/57 |
| 4,937,299 | 6/1990 | Ewen et al. ......................... 526/119 |
| 4,958,770 | 9/1990 | Mitchell . |
| 5,026,736 | 6/1991 | Pontiff . |
| 5,047,476 | 9/1991 | Keogh ................................. 525/106 |
| 5,053,446 | 10/1991 | Salyer ................................. 524/8 |
| 5,112,919 | 5/1992 | Furrer et al. ....................... 525/263 |
| 5,152,204 | 9/1992 | Struglinski ......................... 252/52 R |
| 5,186,851 | 2/1993 | Gutierrez et al. .................. 252/49.006 |
| 5,210,150 | 5/1993 | Prejean . |
| 5,246,783 | 9/1993 | Spenadel et al. .................. 524/114 |
| 5,268,115 | 12/1993 | Gutierrez et al. .................. 252/51.5 R |
| 5,272,236 | 12/1993 | Lai et al. ............................ 526/348.5 |
| 5,275,747 | 1/1994 | Gutierrez et al. ............... 252/51.005 A |
| 5,277,833 | 1/1994 | Song et al. ......................... 252/56 R |
| 5,278,264 | 1/1994 | Spaleck et al. ..................... 556/127 |
| 5,278,272 | 1/1994 | Lai et al. ............................ 526/348.5 |
| 5,288,762 | 2/1994 | Park et al. ........................... 521/79 |
| 5,329,033 | 7/1994 | Spaleck et al. ..................... 556/53 |
| 5,345,002 | 9/1994 | Song et al. ......................... 568/793 |
| 5,346,925 | 9/1994 | Sugano et al. . |
| 5,350,817 | 9/1994 | Winter et al. ....................... 526/119 |
| 5,366,647 | 11/1994 | Gutierrez et al. .................. 255/51.5 A |
| 5,376,428 | 12/1994 | Palazzotto et al. ................. 428/143 |
| 5,382,698 | 1/1995 | Song et al. ......................... 568/3 |
| 5,385,972 | 1/1995 | Yamamoto et al. ................ 524/579 |
| 5,391,629 | 2/1995 | Turner et al. ....................... 525/268 |
| 5,461,110 | 10/1995 | Arthurs et al. . |
| 5,589,519 | 12/1996 | Knaus . |
| 5,604,033 | 2/1997 | Arthurs et al. . |
| 5,604,288 | 2/1997 | Furukawa et al. . |
| 5,605,937 | 2/1997 | Knaus . |
| 5,612,510 | 3/1997 | Hildreth . |
| 5,643,969 | 7/1997 | Sakamoto et al. . |

CROSS-LINKED FOAM STRUCTURES OF POLYOLEFINS AND PROCESS FOR MANUFACTURING

This is a continuation of U.S. Ser. No. 08/308,801, filed Sep. 19, 1994, now abandoned.

FIELD OF THE INVENTION

This invention relates generally to the art of polymeric foams, and in particular to a new cross-linked polyolefin foam composition and a method for making the same.

BACKGROUND OF THE INVENTION

Current art for the production of cross-linked polyolefin foam structures involves the use of conventional high-pressure reactor-produced, low density polyethylene (LDPE). LDPE is comprised of a wide-ranging distribution of branch lengths, best characterized as "long- but variable-chain branching", and a molecular weight distribution (Mw/Mn) which is generally greater than about 3.5. LDPE resin densities, which directly relate to the resulting bulk property stiffness, typically range between 0.915 to about 0.930, thus limiting the degree of mechanical flexibility in foam structures thereof since the lower limit of secant moduli for LDPE is about 20 ksi. While processability of LDPE is quite good, the physical properties, in particular the tensile strength, low-temperature flexibility and toughness, are less than would be obtained from a linear low density polyethylene (LLDPE), due in part to the substantially non-linear nature of LDPE and the profusion of "long-chain branches."

Conventional linear low density polyethylene (LLDPE) exhibits physical properties which are superior to that of LDPE at about the same range of resin densities, but show somewhat higher secant moduli and are difficult to process, resulting in foams with poor cell structure and higher than desired foam structure densities. LLDPE resins, produced by conventional Ziegler transition metal catalysts in the copolymerization of ethylene with one or more alpha-unsaturated monomers, exhibit considerably narrower molecular weight distributions than LDPE, higher molecular weights, and typically only about 15–20 "short-chain branches" per 1000 carbon atoms. Melt-processing in general, and foam processing in particular, are greatly enhanced by the ability of the resin to "shear-thin" or demonstrate a strong, inverse dependency of melt viscosity toward shear rate. "Shear thinning" increases with the degree of branching, which is exemplified in the relative shear-insensitivity of LLDPE and particularly HDPE and resulting foam processing difficulty. Commercially-available LLDPE resins with densities below about 0.910 g/cc are unavailable, thus further limiting the flexibility of foam structures thereof.

Very low density polyethylene (VLDPE) is a special subset of LLDPE wherein an even greater number of "short-chain branches" (ca. 30–50 per 1000 carbon atoms) are effected by appropriate level of comonomer to result in much lower resin densities than LLDPE, e.g. 0.88 g/cc to 0.91 g/cc. These materials thus exhibit greater flexibility than LLDPE. However, generally with conventional linear polyolefins, the greater the number of "short-chain branches," the lower the resulting resin density, but also the shorter the length of the molecular backbone. The presence of shorter molecular backbones, with greater comonomer content therein, prematurely leads to a phenomena known as "melt fracture," which is manifested as the onset of perturbations at the surface of an extrudate with increasing shear rate, resulting in loss of control of the quality of such profiled, extrudable materials.

Certain other undesirable structural features accompany efforts to increase "short-chain branching" while employing conventional linear polyethylene technology, such as an increase in the non-uniformity of the distribution of branches on the molecular backbone. Additionally, conventional linear polyethylene technology leads to a distribution of molecular weights, with a greater propensity of incorporation of the alpha-unsaturated comonomer into the lower molecular weight fractions, thereby leading to melt fracture. Also, as a result of this non-uniformity of molecular weights and distribution of comonomeric species within and among the distribution thereof, linear polyolefins exhibit less than optimal performance in various parametric standards such as toughness, particularly at low temperatures, and stability of extrusion, particularly at high rates.

Many of the above noted deficiencies in the foamable polyolefin art could be satisfied through the use of a linear olefinic resin which is essentially free of "long-chain branches", and which has a molecular weight that is sufficiently high to preclude melt-fracture, a narrow molecular weight distribution, a considerable melt-viscosity/shear rate sensitivity and a full range of resin densities. Such a linear polyolefin would exhibit the preferred balance of physical properties, would exhibit good toughness and processability, and would be available in a range of resin flexibilities. It is thus an object of this invention to provide a linear olefinic resin which possesses these characteristics.

Various catalysts are known to the art of polyolefin foams. "Metallocenes" are one class of highly active olefin catalysts, well known in the art of preparation of polyethylene and copolymers of ethylene and alpha-unsaturated olefin monomers. U.S. Pat. No. 4,937,299 (Ewen et. al.) teaches that the structure of the metallocene catalyst includes an alumoxane which is formed when water reacts with trialkyl aluminum with the release of methane, which complexes therein with the metallocene compound to form the active catalyst. These catalysts, particularly those based on group IV B transition metals such as zirconium, titanium and hafnium, show extremely high activity in ethylene polymerization.

Metallocene catalysts have great versatility in that, by manipulation of process conditions such as catalyst composition and reactor conditions, they can be made to provide polyolefins with controlled molecular weights from as low as about 200 to about 1 million or higher. Exemplary of the latter case is ultra-high molecular weight linear polyethylene. At the same time, the molecular weight distribution of the polymers thereof can be controlled from extremely narrow to extremely broad, i.e. from less than 2 to greater than 8.

Metallocene catalysts are particularly advantageous in the preparation of copolymers of ethylene and one or more alpha-unsaturated olefin comonomers to provide highly random distributions of comonomer within each and every molecular backbone, while separately controlling the average molecular weight as well as the distribution of molecular weights about the average. It is thus an object of the present invention to use the versatility of metallocene catalysts to produce linear olefinic resins having the aforementioned properties.

These and other objects are realized by the present invention, as disclosed herein.

SUMMARY OF THE INVENTION

According to one embodiment of the present invention, there is provided a method of producing a foamed, crosslinked structure comprising the steps of: (a) providing a polymeric composition which is composed of at least 5% and up to 100% of a polyolefin copolymer, wherein said copolymer is produced from ethylene and one or more alpha-unsaturated ethylenic monomers, and is substantially free of "long-chain branching"; (b) inducing the cross-linking reaction; and (c) expanding the composition. In this embodiment, the polyolefin copolymer comprises a polymer selected from the group of ethylene polymerized with at least one comonomer selected from the group consisting of at least one alpha-unsaturated C3 to C20 comonomer and optionally at least one C3 to C20 polyene, has a resin density in the range of about 0.86 g/cm3 to about 0.96 g/cm3, a melt index in the range of about 0.5 dg/min to about 100 dg/min, a molecular weight distribution in the range of from about 1.5 to about 3.5, and a composition distribution breadth index greater than about 45 percent.

According to another embodiment of the present invention, there is provided a method of producing a foamed, cross-linked structure comprising the steps of: (a) providing a polymeric composition which comprises at least 5% and up to 100% of a polyolefin copolymer, wherein said copolymer is produced from ethylene and one or more alpha-unsaturated ethylenic monomers and is substantially free of branch lengths exceeding 20 carbon atoms; (b) inducing the cross-linking reaction; and (c) expanding the composition.

The expansion of the composition may be accomplished by use of a decomposable foaming agent, or by use of a physically-expanding, volatile foaming agent. The cross-linking may be effected by reacting the foam composition with a silane cross-linking agent, which may be subsequently combined with other polymeric resins, and then effecting the cross-linking by exposing the mixture to moisture, possibly with the use of a suitable silanol condensation catalyst.

In other embodiments, the cross-linking of the polymeric composition is effected by free-radical initiators, or by irradiation.

In the preferred embodiment, the cross-linked foam structures exhibit 70% or greater closed-cells, and densities greater than about 0.7 lb/cu.ft. but less than about 22 lb/cu.ft.

The present invention also contemplates the addition of other resins, particulate and fibrous fillers, antioxidants, ultra-violet and thermal stabilizers, pigments and colorants, cell-growth nucleants such as talc, cell-structure stabilizers such as fatty acids or amides, property-modifiers, processing aids, additives, catalysts to accelerate cross-linking and other reactions, and other materials which will be obvious to one skilled in the art.

DETAILED DESCRIPTIONS

The present invention is a unique class of cross-linked, polyolefin foam compositions which, by virtue of the catalyst technology and methods utilized in their preparation from monomeric alpha-olefins, manifest a molecular structure that greatly facilitates processing and exhibits superior physical properties for cellular articles made therefrom.

There are a number of structural variables in polyolefin copolymers which effect both the processing characteristics as well as the ultimate physical properties of the polymer, and which thus directly influence the processing and ultimate properties of cross-linked compositions thereof. Two of the most important are the uniformity of molecular weight and the uniformity of distribution of comonomers within each, and among all, of the polymeric molecular backbones.

The uniformity of both molecular weight and comonomer distributions influences the toughness of polymeric materials and articles made therefrom, particularly at low temperatures. Likewise, these factors also influence the stability of melt processability, particularly at high shear rates, as well as the level and balance of other physical properties achievable in articles formed thereof. Additionally, the type and amount of comonomer employed along with ethylene in the polymerization, the average molecular weight, melt index and specific gravity all effect the properties of the subject polyolefin copolymer. The intrinsic properties of the subject polyolefin copolymers along with the relative amount of the copolymers and type and amount of additional polymeric resins are a major factor contributing toward the superiority of the compositions.

Polyolefin resins of this invention possess a narrow molecular weight distribution and are "essentially linear," although they contain the desired level of uniformly distributed, highly controlled "short-chain branching". As a result of this combination, the resins exhibit a strength and toughness approaching that of linear low density polyethylenes, but have processability similar to high pressure, reactor produced low density polyethylene. These "essentially linear" polyolefin resins are characterized by a resin density in the range of about 0.86 g/cm$^3$ to about 0.96 g/cm$^3$, a melt index in the range of about 0.5 dg/min to about 100 dg/min, a molecular weight distribution in the range of from about 1.5 to about 3.5, and a composition distribution breadth index greater than about 45 percent.

As used throughout this disclosure, the term "linear polyolefin" refers to an olefin polymer lacking "long-chain branching," as exemplified by the conventionally produced linear low density polyethylene or linear high density polyethylene polymers made using Ziegler polymerization processes and disclosed, for example, in U.S. Pat. Nos. 4,076, 698 and 3,645,992. The term does not refer to high pressure, reactor produced branched polyethylenes, or to copolymers of ethylene and vinyl acetate, vinyl alcohol, ethyl acrylate, methyl acrylate, acrylic acid, or the like which are made using high-pressure technology and which are known to have numerous long-chain branches.

As used throughout this disclosure, the term "essentially linear" refers to a "linear polymer" with a molecular backbone which is virtually absent of "long-chain branching," to the extent that less than about 0.01 "long-chain branches" per one-thousand carbon atoms are manifested thereof. Similarly, as used throughout this disclosure, the phrase "substantially free from long-chain branching" refers to a "linear polymer" with a molecular backbone with less than about 0.01 "long-chain branches" per one-thousand carbon atoms manifested thereof.

As used throughout this disclosure, the term "long chain branching" refers to a molecular branch of a molecular backbone of at least 6 carbon atoms, above which the length cannot be distinguished using 13C nuclear magnetic resonance (NMR) spectroscopy. The long chain branch can be as long as about the same length as the molecular backbone. Methods of quantifying long chain branching by use of 13C NMR spectroscopy were described by Randall (Rev. Macromol. Chem. Phys., C29 (2&3), p. 285–297).

As used throughout this disclosure, the term "short-chain branching" is defined as a molecular branch of a molecular backbone of less than 6 carbon atoms which, as described above, would be distinguishable by 13C NMR spectroscopic methods.

As used throughout this disclosure, the term "copolymer" refers to material resulting from the polymerization of two or more monomeric species, and specifically encompasses terpolymers (e.g., materials resulting from the polymerization of three or more monomeric species), sesquipolymers, and greater combinations of monomeric species thereof.

The densities, or specific gravities, of the resins herein disclosed were measured using ASTM D-792 methods, except that they were additionally conditioned by holding them for 48 hours at ambient temperature (23° C.) prior to the density measurements. The essentially linear polyolefin resins disclosed in this invention are generally characterized by a resin density in the range of about 0.86 g/cm3 to about 0.96 g/cm3, preferably of about 0.86 g/cm3 to about 0.91 g/cm3.

The "Melt Index" (MI) is a measurement of processability under low shear rate conditions, in accordance with ASTM D-1238 Condition E (190° C./2.16 kg). For the essentially linear polyolefins disclosed in this invention, the MI is generally in the range of about 0.2 dg/min to about 100 dg/min. Preferably, the MI is in the range of about 1 dg/min to about 10 dg/min, and most preferably in the range of about 2 dg/min to about 8 dg/min.

The molecular weight distribution (MWD or Mw/Mn) is a parameter determined by use of gel permeation chromatography with multiple mixed-porosity columns, comparing elution volumes of the unknown to those of narrow MWD polystyrene standards. The correspondence is accomplished by using the appropriate Mark-Houwink coefficients for the polystyrene standard and the polyethylene unknown, with procedures as described by Williams and Word in Journal of Polymer Science, Polymer Letters, Vol. 6, (621) 1968, incorporated herein by reference.

The Composition Distribution Breadth Index (CDBI) is a measurement of the uniformity of distribution of comonomer to the copolymer molecules, and is determined by the technique of Temperature Rising Elution Fractionation (TREF), as described in, for example, Wild et. al., J. Poly. Sci., Poly. Phys. Phys. Ed., Vol. 20, p. 441 (1982). This attribute relates to polymer crystallizability, optical properties, toughness and many other important performance characteristics of compositions of the present art. For example, a polyolefin resin of high density with a high CDBI would crystallize less readily than another with a lower CDBI but equal comonomer content and other characteristics, enhancing toughness in objects of the present invention. The benefits to the discovery of the subject invention that accrue through the specific use of essentially linear polyolefin copolymers of narrow composition distribution are elucidated later in the examples.

As used herein, the CDBI is defined as the weight percent of the copolymer molecules having a comonomer content within 50% (i.e. +/−50%) of the median total molar comonomer content. Unless otherwise indicated, terms such as "comonomer content," "average comonomer content" and the like refer to the bulk comonomer content of the indicated interpolymer blend, blend component or fraction on a molar basis. For reference, the CDBI of linear poly(ethylene), which is absent of comonomer, is defined to be 100%. CDBI determination clearly distinguishes the low density polyolefins of this art, which show narrow composition distribution as assessed by CDBI values generally above 70%, from very low density polyolefin copolymers produced by conventional linear catalyst technology, which have a broad composition distribution as assessed by CDBI values generally less than 55%. The CDBI of the essentially linear polyolefin copolymers disclosed in this invention is generally about 45% or higher. Preferably, the CDBI is about 50% or higher. More preferably, the CDBI is about 60% or higher, and most preferably, about 70% or higher.

The "essentially linear" polyolefin copolymers of the present invention are preferably produced through the use of metallocene catalysts in accordance with any suitable polymerization process, including gas phase polymerization, slurry polymerization, and high pressure polymerization. However, the methods of the present invention are not restricted to the use of metallocene catalysts. Preferably, the "essentially linear" polyolefins used in the foam compositions of the present invention are produced by gas-phase polymerization. Gas phase polymerization processes generally utilize super-atmospheric pressures and temperatures in the range of about 50° C. to about 120° C. Such polymerization can be performed in a stirred or fluidized bed of catalyst and product particles in a pressurized vessel adapted to facilitate the separation of product particles form unreacted gases therein. Maintenance of temperature may be accomplished by circulation of ethylene, comonomer, hydrogen or inert gas such as nitrogen. Triethylaluminum may be added as needed as a scavenger of water, oxygen, and other undesirable impurities. Polymer produced thereof may be withdrawn continuously or semi-continuously at a rate necessary to maintain a constant product inventory in the reactor.

Subsequent to polymerization and deactivation of the catalyst, the product copolymer may be recovered by any suitable means. In commercial practice, the polymeric product can be recovered directly from the gas phase reactor, freed of residual monomer with a nitrogen purge, and used without further deactivation or catalyst removal.

The essentially linear polyolefin copolymers of the present invention may also be produced using a high pressure process by polymerizing ethylene in combination with the other desired monomers in the presence of the metallocene alumoxane catalyst system. Critical to this method is that the polymerization temperature be above 120° C., but below the decomposition temperature of the product, and that the polymerization pressure be above about 500 kg/cm2. In certain instances wherein the molecular weight of the product must be controlled, any of the suitable techniques known in the art for control of molecular weight, such as the use of hydrogen or reactor temperature, may be employed to effect such control therein.

The essentially linear olefinic copolymers of the present invention are preferably derived from ethylene polymerized with at least one comonomer selected from the group consisting of at least one alpha-unsaturated C3 to C20 olefin comonomer, and optionally one or more C3 to C20 polyene. The types of comonomers selected to produce the essentially linear polymer utilized in the present invention will depend upon economics and the desired end-use of the resultant cross-linked foam structure.

Generally, the alpha-unsaturated olefin comonomers suitable for use in the present invention contain in the range of about 3 to about 20 carbon atoms. Preferably, the alpha-unsaturated olefins contain in the range of about 3 to about 16 carbon atoms, and most preferably in the range of about 3 to about 8 carbon atoms. Illustrative, non-limiting examples of such alpha-unsaturated olefin comonomers used as copolymers with ethylene include propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinyl cyclohexene, vinylbenzocyclobutane and the like.

Generally, the polyenes used in the present invention contain about 3 to about 20 carbon atoms. Preferably, the polyenes contain about 4 to about 20 carbon atoms, and most preferably about 4 to about 15 carbon atoms. Preferably, the polyene is a straight-chain, branched chain or cyclic hydrocarbon diene having from about 3 to about 20 carbon atoms, more preferably from about 4 to about 15 carbon atoms, and most preferably from about 6 to about 15 carbon atoms. It is also preferred that the diene is non-conjugated. Illustrative non-limiting examples of such dienes include 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene and dicyclopentadiene. Especially preferred is 1,4-hexadiene.

Preferably, the polymeric foam composition of the present invention will comprise either ethylene/alpha-unsaturated olefin copolymers or ethylene/alpha-unsaturated olefin/diene terpolymers. Most preferably, the essentially linear copolymer will be ethylene/1-butene or ethylene/1-hexene.

The comonomer content of the olefin copolymers utilized in the present invention is typically in the range of about 1 percent to about 32 percent (based on the total moles of monomer), preferably in the range of about 2 percent to about 26 percent, and most preferably in the range of about 6 percent to about 25 percent.

The preferred essentially linear olefin copolymers used in making the products of the present invention are produced commercially by Exxon Chemical Company, Baytown, Tex., under the tradename Exact™, and include Exact™ 3022, Exact™ 3024, Exact™ 3025, Exact™ 3027, Exact™ 3028, Exact™ 3031, Exact™ 3034, Exact™ 3035, Exact™ 3037, Exact™ 4003, Exact™ 4024, 41, Exact™ 4049, Exact™ 4050, Exact™ 4051, Exact™ 5008, and Exact™ 8002. Most preferably, the essentially linear olefin copolymers are selected from the group consisting of Exact™ 3024, Exact™ 4041, Exact™ 5008. However, one skilled in the art will appreciate that other resins satisfying the requirements of an absence of long-chain branching, the range of molecular weight distributions, the range of composition distribution breadth indices, the range of resin densities, and the range of melt flow indices, are also available and may be used without departing from the scope of the invention.

While the aforementioned essentially linear olefin copolymers are most preferable as the compositions of this invention, the addition of other polymers or resins to the composition, either prior or subsequent to grafting or cross-linking, can result in certain advantages in the economic, physical and handling characteristics of the cellular articles made in accordance with this invention. Examples of the polymers and resins which may be advantageously added include low density polyethylene, high density polyethylene, linear low density polyethylene, medium density polyethylene, polypropylene, ethylene propylene rubber, ethylene propylene diene monomer terpolymer, polystyrene, polyvinyl chloride, polyamides, polacrylics, cellulosics, polyesters, and polyhalocarbons. Copolymers of ethylene with propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, methyl methacrylate, acrylic acid, and methacrylic acid may also be used. Various polymers and resins which find wide application in peroxide-cured or vulcanized rubber articles may also be added, such as polychloroprene, polybutadiene, polyisoprene, poly(isobutylene), nitrile-butadiene rubber, styrene-butadiene rubber, chlorinated polyethylene, chlorosulfonated polyethylene, epichlorohydrin rubber, polyacrylates, and butyl or halo-butyl rubbers. Other resins are also possible, as will be apparent to one skilled in the art, including blends of the above materials. Any or all of the additional polymers or resins may be advantageously grafted or cross-linked, in concert or separately, within the scope of the object of this invention.

Preferred resins, to be added to the object copolymer of this invention, include polypropylene, polystyrene, low density polyethylene, linear low density polyethylene, ethylene/ethyl acrylate, and ethylene/methyl acrylate, and combinations of two or more of these materials. The preferred level of the essentially linear polyolefin copolymer, as a percentage of total polymeric resin, preferably ranges from about 5% to about 100%, more preferably from about 10% to about 60%, and most preferably from about 10% to about 40%.

The cross-linking of the compositions useful in the practice of the present invention is preferably accomplished by the use of chemical cross-linking agents or high-energy radiation. Suitable methods of chemical cross-linking include the use of decomposable, free-radical generating species, or the use of silane-grafting, wherein the molecular backbone of the constituents of said composition are chemically reacted with a subsequently cross-linkable chemical species. In the latter case, the cross-link is appropriately effected by the use of warm, moist conditions subsequent to the grafting step, optionally with a suitable catalyst. Combinations of methods of cross-linking may be utilized to facilitate the degree of control and achieve the desired level of cross-linking.

Representative chemical cross-linking agents which are usefully employed herein include the organic peroxides, azido and vinyl functional silanes, multifunctional vinyl monomers, organo-titanates, organo-zirconates and p-quinone dioximes. The chemical cross-linking agent may be advantageously selected by reference to the processing temperature and permissible time at the desired event of said cross-linking reaction. That is to say, by selecting a chemical cross-linking agent which exhibits a half-life of between one minute and 60 minutes at the preferred temperature of the cross-linking event, the rate of cross-linking may be expeditiously induced with the required degree of control. The processing temperature and permissible time of the cross-linking event are often dictated by material handling requirements, for example proper conveyance of the composition through an extruder at reasonable rates thereof.

Suitable chemical cross-linking agents for the compositions of this invention include, but are not limited to, organic peroxides, preferably alkyl and aralkyl peroxides. Examples of such peroxides include:

dicumylperoxide, 2,5-dimethyl-2,5-di(t-butylperoxy) hexane, 1,1-bis(t-butylperoxy)-3,3,5-trimethylcyclohexane, 1,1-di-(t-butylperoxy)-cyclohexane, 2,2'-bis(t-butylperoxy) diisopropylbenzene, 4,4'-bis(t-butylperoxy)butylvalerate, t-butyl-perbenzoate, t-butylperterephthalate, and t-butyl peroxide. Most preferably, the cross-linking agent is dicumyl peroxide.

Chemically-crosslinked compositions are improved upon with the addition of multi-functional monomeric species, often referred to as "coagents." Illustrative, but non-limiting, examples of coagents suitable for use in chemical crosslinking in accordance with the present invention include di- and tri-allyl cyanurates and isocyanurates, alkyl di- and tri-acrylates and methacrylates, zinc-based dimethacrylates and diacrylates, and 1,2-polybutadiene resins.

Included in the cross-linking agents that may be used with the present invention are the azido-functional silanes of the general formula RR'SiY$_2$, in which R represents an azido-functional radical attached to silicon through a silicon-to-carbon bond and composed of carbon, hydrogen, optionally sulfur and oxygen; each Y represents a hydrolyzable organic radical; and R' represents a monovalent hydrocarbon radical or a hydrolyzable organic radical.

Azido-silane compounds graft onto an olefinic polymer though a nitrine insertion reaction. Crosslinking develops through hydrolysis of the silanes to silanols followed by condensation of silanols to siloxanes. The condensation of silanols to siloxanes is catalyzed by certain metal soap catalysts such as dibutyl tin dilaurate or butyl tin maleate and the like. Suitable azido-functional silanes include the tri-alkoxysilanes such as 2-(trimethoxylsilyl) ethyl phenyl sulfonyl azide and (triethoxy silyl) hexyl sulfonyl azide.

Other suitable silane cross-linking agents useful in the practice of the present invention include vinyl functional alkoxy silanes such as vinyl trimethoxy silane and vinyl triethoxy silane. These silane cross-linking agents may be represented by the general formula RR'SiY$_2$ in which R represents a vinyl functional radical attached to silicon through a silicon-carbon bond and composed of carbon, hydrogen, and optionally oxygen or nitrogen, each Y represents a hydrolyzable organic radical, and R' represents a hydrocarbon radical or Y.

Usually, free-radical initiating species, such as the organic peroxides described above, are incorporated along with the vinyl alkoxy silane to perform hydrogen extraction from the polymeric molecular backbone, whereupon the vinyl-functional silane may react and graft thereto. For reference, U.S. Pat. No. 3,646,155 presents further examples of such silanes. Subsequently, the grafted polymeric composition may be exposed to moisture to effect silanolysis condensation reactions therein to cross-link multiples of pendant silane grafts. Preferably, the composition contains a suitable condensation catalyst, and further is preferably shaped and formed into the desired profile or shape prior to contact with moisture. Most preferably, the silane cross-linking agent is vinyl trimethoxy silane, grafted on to the polymer backbone by the free-radical reaction which is initiated by 2,2'-bis(t-butylperoxy) diisopropylbenzene. The most preferred silanol condensation catalyst is dibutyl tin dilaurate, which greatly facilitates the cross-linking of pendent silane groups in the presence of moisture, preferably in hot water.

Methods of effecting the moisture induced cross-linking by condensation of silane grafts are widely disclosed in the art. Aside from the obvious exposure to hot water, preferably at a temperature above the softening point of the composition, hydrated inorganic compounds such as gypsum or other water-solvable or water-absorbing species may be incorporated into the composition which, upon heating the composition above the hydration-liberation temperature, advantageously release moisture to effect the condensation or silane pendent groups. Alternatively, moisture may be introduced directly into continuous melt-processing equipment, such as an extruder, either alone or in combination with one of the components of the composition, preferably at a downstream feeding port, optionally in combination with a physically expanding foaming agent. For example, U.S. Pat. No. 4,058,583 (Glander) discloses the injection of moist inert gasses, such as nitrogen, into a downstream port of a profile extruder, to both effect the expansion of silane-grafted compositions and the condensation of the silanes.

For moisture-cured polyolefin systems wherein long-term moisture stability is essential, U.S. Pat. No. 4,837,272 (Kelley) discloses methods of subsequently reacting the silane-grafted compositions with organo titanates to result in relatively moisture-stable adducts which readily cross-link in the presence of atmospheric moisture, even in absence of silanol condensation catalysts, to form the cross-linked structures.

Suitable methods for cross-linking olefinic compositions with high-energy, ionizing radiation involve the use of equipment which generates electrons, X-rays, Beta-rays or Gamma-rays. "Ionizing radiation" denotes electro-magnetic waves or charged particles having the ability to interact directly or indirectly with a substance and consequently ionizing the substance. "High energy" is used to denote the relatively high potential of such radiation, necessary to uniformly and sufficiently penetrate the articles of the composition of this invention.

The most preferred method for cross-linking olefinic compositions through exposure to ionizing radiation is through the use of an electron-beam radiation source. The use of electron-beam radiation cross-linking results in fine cell structure and good surface quality, due in large part to the completion of cross-linking prior to the initiation of the expansion process step. Disadvantages of this method include the high cost of the equipment and the infeasibility of utilizing this method in a continuous manufacture, since a single electron-beam source will only be economically supported by many continuous extrusion lines. Furthermore, certain polymers are susceptible to preferential chain scission or degradation instead of undergoing the desired cross-linking reaction.

Exposure of the compositions of the present invention to ionizing radiation may be accomplished at dosages in the range of about 0.1 to 40 Megarads, and preferably, at about 1 to 20 Megarads. U.S. Pat. No. 4,203,815 (Noda) discloses methods of exposing compositions to both high and low-energy ionizing radiation to effect improvements in surface quality, strength and subsequent heat-sealing or embossing processes. The amount of cross-linking may be appropriately controlled by the dosage of ionizing radiation, with preference dictated by the requirements of the ultimate application of the composition of this invention. Optionally, coagents as described above may be incorporated into radiation-crosslinked compositions with advantageous results toward cure speed and uniformity of cross-linking.

Regardless of the method of cross-linking used, acceptable foamed articles may only be obtained by utilization of cross-linking over certain ranges of cross-linking density or level. Excessive cross-linking prior to foaming will render the foam composition too inelastic, resulting in less than optimal expansion and greater than optimal density for a given level of foaming agent. For processes which invoke cross-linking subsequent to expansion, excessive cross-linking would be economically inefficient. Less than optimal cross-linking may be detrimental to certain physical properties, such as compression set properties or thermal resistance. One parameter for quantifying the degree of cross-linking is the "gel content" of the composition. The term "gel content," as used in this disclosure, is intended to describe the weight percent of an insoluble portion of the cross-linked product (on a dried basis) remaining after about 50 mg of a sample of the cross-linked product has been immersed in 25 ml of molecular-sieve dried xylene for 24 hours at 120° C. Process conditions should be utilized when providing for a cross-linked foam structure such that the resulting gel content is preferably in the range of about 5% to about 95%, more preferably in the range of about 10% to about 40%, and most preferably in the range of about 12% to about 25%.

The expanding medium, or foaming agents, useful in the practice of the present invention may be normally gaseous, liquid or solid compounds or elements, or mixtures thereof. In a general sense, these foaming agents may be characterized as either physically-expanding or chemically decomposing. Of the physically expanding foaming agents, the term "normally gaseous" is intended to mean that the expanding medium employed is a gas at the temperatures and pressures encountered during the preparation of the foamable compound, and that this medium may be introduced either in the gaseous or liquid state as convenience would dictate.

Included among the normally gaseous and liquid foaming agents are the halogen derivatives of methane and ethane, such as methyl fluoride, methyl chloride, difluoromethane, methylene chloride, perfluoromethane, trichloromethane, difluoro-chloromethane, dichlorofluoromethane, dichlorodifluoromethane (CFC-12), trifluorochloromethane, trichloromonofluoromethane (CFC-11), ethyl fluoride, ethyl chloride, 2,2,2-trifluoro-1,1-dichloroethane (HCFC-123), 1,1,1-trichloroethane, difluoro-tetrachloroethane, 1,1-dichloro-1-fluoroethane (HCFC-141b), 1,1-difluoro-1-chloroethane (HCFC-142b), dichloro-tetrafluoroethane (CFC-114), chlorotrifluoroethane, trichlorotrifluoroethane (CFC-113), 1-chloro-1,2,2,2-tetrafluoroethane (HCFC-124), 1,1-difluoroethane (HFC-152a), 1,1,1-trifluoroethane (HFC-143a), 1,1,1,2-tetrafluoroethane (HFC-134a), perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, and mixtures thereof. Other normally gaseous and liquid foaming agents that may be employed are hydrocarbons and other organic compounds such as acetylene, ammonia, butadiene, butane, butene, isobutane, isobutylene, dimethylamine, propane, dimethylpropane, ethane, ethylamine, methane, monomethylamine, trimethylamine, pentane, cyclopentane, hexane, propane, propylene, alcohols, ethers, ketones, and the like. Inert gases and compounds, such as nitrogen, argon, neon or helium, can be used as foaming agents with satisfactory results.

Solid, chemically decomposable foaming agents, which decompose at elevated temperatures to form gasses, can be used to expand the compositions of the invention. In general, the decomposable foaming agent will have a decomposition temperature (with the resulting liberation of gaseous material) from 130° C. to 350° C. Representative chemical foaming agents include azodicarbonamide, p,p'-oxybis (benzene) sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazides as well as various acid/bicarbonate compounds which decompose when heated.

The preferred volatile liquid foaming agents include isobutane, difluoroethane or blends of the two. For decomposable solid foaming agents, azodicarbonamide is preferred, while for inert gasses, carbon dioxide is preferred.

The art of producing cross-linked foam structures is well known, especially for polyolefin compositions. The foam structure of the present invention may take any physical configuration known in the art, such as sheet, plank, other regular or irregular extruded profile, and regular or irregular molded bun stock. Exemplary of other useful forms of foamed or foamable objects known in the art include expandable or foamable particles, moldable foam particles, or beads, and articles formed by expansion and/or consolidation and fusing of such particles. Such foamable article or particle compositions may be cross-linked prior to expansion, such as for the process of free-radical initiated chemical cross-linking or ionizing radiation, or subsequent to expansion. Cross-linking subsequent to expansion may be effected by exposure to chemical cross-linking agents or radiation or, when silane-grafted polymers are used, exposure to moisture optionally with a suitable silanolysis catalyst.

Illustrative, but non-limiting, of methods of combining the various ingredients of the foamable composition include melt-blending, diffusion-limited imbibition, liquid-mixing, and the like, optionally with prior pulverization or other particle-size reduction of any or all ingredients. Melt-blending may be accomplished in a batchwise or continuous process, and is preferably carried out with temperature control. Furthermore, many suitable devices for melt-blending are known to the art, including those with single and multiple Archimedean-screw conveying barrels, high-shear "Banbury" type mixers, and other internal mixers. The object of such blending or mixing, by means and conditions which are appropriate to the physical processing characteristics of the components, is to provide therein a uniform mixture. One or more components may be introduced in a step-wise fashion, either later during an existing mixing operation, during a subsequent mixing operation or, as would be the case with an extruder, at one or more downstream locations into the barrel.

Expandable or foamable particles will have a foaming agent incorporated therein, such as a decomposable or physically expandable chemical blowing agent, so as to effect the expansion in a mold upon exposure of the composition to the appropriate conditions of heat and, optionally, the sudden release of pressure.

One preferred method of providing a sheet object of this invention involves silane-grafting, subsequent extrusion of a melt-blended profile, moisture-induced cross-linking of the profile, and finally oven-expansion of the profile. In the first step, a portion of the polymeric resins of the foam composition, which contains at least a portion of the essentially linear olefin copolymer of this disclosure, is melt-blended with a 20:1 mixture of vinyl trimethoxy silane (VTMOS) and dicumyl peroxide in an extruder to effect the grafting of VTMOS onto the polymers. This composition is extruded out of a multiple-strand die face, is chilled in water, and is then pelletized. In a subsequent step, the silane-grafted composition, along with ungrafted polymeric resins, chemically decomposable foaming agents, colorants, pigments, dibutyl tin dilaurate silanolysis catalyst, or, optionally, antioxidants and stabilizers, are melt-blended and extruded out of a sheet die and then passed through a three-roll stack to shape the profile to the correct gauge. The unexpanded sheet is then passed through a hot-water tank for sufficient time to effect the cross-linking, and is then passed through a gas-fired, hot-air oven to effect the decomposition of the foaming agent and expansion.

In another preferred method, the extruded profile from the above method, prior to exposure to hot water, is multiple-stacked and consolidated in a press within a suitable mold at a temperature below the decomposition of the foaming agent. Subsequently, it is exposed to hot water for sufficient time so as to effect the cross-linking via the silanolysis reaction. Optionally, at this point the resulting preform is again placed into a high-pressure press within a suitable mold to initiate the foaming agent decomposition. Finally, the partially expanded preform is fully expanded within a hot-air forced-convection oven.

In an alternate procedure, a "Banbury" type mixer is used to fuse a mixture of the grafted composition and other ungrafted resins and components. The fused mixture is then molded into a preform, cross-linked by exposure to hot water, and then expanded as described above.

In yet another preferred method, a silane-grafted composition is melt-blended with a physically-expanding foaming agent such as isobutane, additional ungrafted polymeric resins, dibutyl tin dilaurate silanolysis catalyst, nucleants such as talc, and optionally antioxidants and stabilizers in a single-screw extruder. Optionally, a twin-screw extruder may be utilized. This composition is extruded out of a coat-hanger die whereupon the foaming agent expands and a fully-expanded foam sheet or plank results thereof. The net-shape sheet, plank, or board is the placed in humid storage for sufficient time to effect the cross-linking.

Several additives, as are known to the art, may be added to the compositions of the present invention without departing from the scope of the invention. Specifically contemplated is the addition of materials which are relevant toward cross-linked foam structure compositional development and production, such as particulate and fibrous fillers to reinforce, strengthen or modify the rheological properties of the foam composition. Also contemplated is the addition of antioxidants (e.g., hindered phenolics such as Irganox 1010, phosphites such as Irgafos 168, or polymerized trimethyl-dihydroquinoline such as Agerite AK, Resin D or Flectol H), ultra-violet and thermal stabilizers, pigments or colorants, cell-growth nucleants such as talc and the like, cell-structure stabilizers such as fatty-acids, -esters (e.g. glycerol monostearate) or -amides, property-modifiers, processing aids, additives, catalysts to accelerate cross-linking or other reactions, and blends of two or more of the aforementioned materials.

Table IA is a non-limiting tabulation of certain parametric characteristics of some essentially linear polyolefin copolymers which are suitable for use with the present invention. The materials in Table IA are commercially available and are produced by the Exxon Chemical Company at its facility in Baytown, Tex.:

TABLE IA

| Product Designation | Melt Index (dg/min) | Density (g/cc) | Co-monomer Type | Content | CDBI (%) | Mw/Mn |
|---|---|---|---|---|---|---|
| Exact ™ 4041 | 3.0 | 0.878 | 1-butene | 23.5% | NA | 20 + 02 |
| Exact ™ 5008 | 10 | 0.865 | 1-butene | 31.6% | NA | 20 + 02 |
| Exact ™ 4028 | 10 | 0.880 | 1-butene | 23.1% | NA | 20 + 02 |
| Exact ™ 4017 | 4.0 | 0.885 | 1-butene | 20.2% | NA | 20 + 02 |
| Exact ™ 3024 | 4.5 | 0.905 | 1-butene | 11.2% | 83.7% | 20 + 02 |
| Exact ™ 3025 | 1.2 | 0.910 | 1-hexene | 9.6% | >83% | 20 + 02 |
| Exact ™ 3012 | 4.5 | 0.910 | 1-hexene | 10.4% | 88.2% | 20 + 02 |
| Exact ™ 3011 | 3.5 | 0.910 | 1-hexene | 11.1% | 92.0% | 20 + 02 |
| Exact ™ 3030 | 2.25 | 0.905 | 1-hexene | 12.9% | 92.2% | 20 + 02 |
| Exact ™ 3031 | 3.5 | 0.900 | 1-hexene | 15.4% | >88% | 20 + 02 |

Notes:
NA = Not Applicable, polymer is too soluble to determine by TREF

The following examples are illustrative of certain features of the present invention, and are not intended to be limiting.

Examples 1–7 illustrate the continuous extrusion process of the present invention.

EXAMPLE 1

A silane-grafted composition, consisting primarily of a resin of the present invention along with polyethylene/ethyl acrylate (EEA) as a softener, was prepared at the rate of about 30 lb/hr using a 60 mm diameter, 24:1 L/D, single-screw extruder maintained at approximately 200° C. A mixture of organic peroxide and vinyl trimethoxy silane was metered directly into the feed throat of the extruder. The grafted composition was passed out of a multi-strand die head through a water-cooling trough, and chopped into pellets with a granulator. The composition of the pellets consisted of:

| pbw | Material |
|---|---|
| 90 | Exact ™ 4041, Exxon Chemical Co. |
| 10 | DPDA 6182 (0.930 g/cm3, 1.5 MI), polyethylene/ethyl acrylate, 15% ethyl acrylate content, Union Carbide Corp. |
| 0.4 | #CV4917, Vinyl trimethoxy silane, Huls America, Inc. |
| 0.02 | Vulcup-R, 2,2'-bis(tert-butylperoxy)diisopropyl benzene, Hercules Chemical Co. |

The pellicular grafted composition was admixed with additional pellicular components in a 5 gallon drum tumbler, metered into a 2.5" diameter, 24:1 L/D single-screw extruder maintained at approximately 125° C. and fitted with a 14" wide coat-hanger die head, and passed through a 24" wide three-roll stack to form an unexpanded sheet, 9" wide× 0.069" thick, of the following composition:

| pbw | Material |
|---|---|
| 78.9 | Exact ™ 4041/DPDA 6182 graft, from above |
| 3.3 | DFDA-1173 NT, 1% dibutyl tin dilaurate concentrate in LDPE (0.92 g/cm3, 2.0 mi), Union Carbide Corp. |
| 11.6 | 40% concentrate of Bayer ADC/F azodicarbonamide in EEA-6182 |
| 3.9 | 20% zinc stearate, 30% zinc oxide concentrate in high-pressure LDPE (7–8 MI) |
| 2.3 | White color concentrate, 50% titanium dioxide in high-pressure LDPE (7–8 MI) |

The sheet was exposed to 190° F. and 95% relative humidity for 80 minutes to effect the silanolysis cross-linking. Subsequently, the sheet was passed through a thermostatically-controlled foaming oven with infrared heaters to maintain a surface temperature of 670° F., but with supplementary makeup air at 730° F., whereupon the cross-linked composition expanded to a width of 20"×0.150" thickness. The resulting density was 6 pcf, with additional properties as shown in Table I.

COMPARATIVE EXAMPLE 1A

A silane-grafted, pellicular composition, comprising a mixture of LDPE and LLDPE, was prepared at the rate of about 400 lb/hr using a 4" diameter, 44:1 L/D, single-screw extruder maintained at approximately 200° C. A mixture of organic peroxide and vinyl trimethoxy silane was metered directly into the feed throat of the extruder. The grafted composition was passed out of a multi-strand die head and through a water-cooling trough, and was chopped into pellets with a granulator. The composition consisted of:

| pbw | Material |
|---|---|
| 67 | LF-0219A, LDPE (0.919 g/cm3, 2.0 MI), Novacor Chemical Co. |
| 33 | ETS 9078, LLDPE (0.910 g/cm3, 2.5 MI), Union Carbide Corp. |

-continued

| pbw | Material |
|---|---|
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The pellicular grafted composition was admixed with additional pellicular components in a 200 gallon ribbon blender. The mixture was metered into a 6" diameter, 24:1 L/D single-screw extruder maintained at approximately 125° C. and fitted with a 30" wide coat-hanger die head, and passed through a 52" wide three-roll stack to form an unexpanded sheet of the following composition:

| pbw | Material |
|---|---|
| 67.5 | LF-0219A/ETS 9078 graft, from above |
| 11.2 | LF-0219A, LDPE (0.919 g/cm3, 2.0 MI), Novacor Chemical Co. |
| 3.5 | DFDA-1173 NT, 1% dibutyl tin dilaurate concentrate in LDPE (0.92 g/cm3, 2.0 mi), Union Carbide Corp. |
| 9.8 | 40% concentrate of Bayer ADC/F azodicarbonamide in LDPE (0.919 g/cm3, 2.0 MI) |
| 6.0 | 20% zinc stearate, 30% zinc oxide concentrate in high-pressure LDPE (7–8 MI) |
| 2.0 | White color concentrate, 50% titanium dioxide in high-pressure LDPE (7–8 MI) |

As described above, the sheet was exposed to 190° F. moisture to effect the silanolysis cross-linking then passed through a thermostatically-controlled foaming oven. The resulting density was 6 pcf, with comparative properties as shown in Table I. The object cross-linked foam structure of Example 1, containing the essentially linear olefin copolymer of this invention, exhibited superior tensile strength, elongation, compression set and a finer cell size, in comparison to the LLDPE/LDPE foam article of this example.

EXAMPLE 2

This example illustrates the preparation of a 2 pcf density foam structure in accordance with the method of the present invention.

The essentially linear olefin copolymer silane-grafted composition of Example 1 was admixed with additional pellicular components, extruded on a sheet line with coat-hanger die and three-roll stack as described in Example 1, and slit down into a continuous sheet 5" wide and 0.070" thick and having the following composition:

| pbw | Material |
|---|---|
| 56.7 | Exact ™ 4041/DPDA 6182 graft, from Example 1, above |
| 3.6 | DFDA-1173 NT, 1% dibutyl tin dilaurate concentrate in LDPE (0.92 g/cm3, 2.0 mi), Union Carbide Corp. |
| 33.2 | 40% concentrate of Bayer ADC/F azodicarbonamide in EEA-6182 |

-continued

| pbw | Material |
|---|---|
| 4.0 | 20% zinc stearate, 30% zinc oxide concentrate in high-pressure LDPE (7–8 MI) |
| 2.5 | White color concentrate, 50% titanium dioxide in high-pressure LDPE (7–8 MI) |

The sheet was then exposed to 200° F./95% relative humidity for 60 minutes to effect the silanol condensation and cross-linking. Subsequently, the sheet was passed through a thermostatically-controlled foaming oven with infrared heaters to maintain a surface temperature of 680° F., but with supplementary makeup air at 750° F., whereupon the sheet expanded to a width of 20"×0.365" thickness. The resulting density was 2.2 pcf, with additional properties as shown in Table I.

COMPARATIVE EXAMPLE 2A

A silane-grafted, pellicular composition was prepared using the same equipment and methods as described in Example 1A, but with a mixture of LDPE and LLDPE, according to the following composition:

| pbw | Material |
|---|---|
| 80 | LF-0219A, LDPE (0.919 g/cm3, 2.0 MI), Novacor Chemical Co. |
| 20 | ETS 9078, LLDPE (0.910 g/cm3, 2.5 MI), Union Carbide Corp. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The pellicular grafted composition was admixed with additional pellicular components and extruded on a sheet line with coat-hanger die and three-roll stack, as described in Example 1A, to give an extrudate of the following composition:

| pbw | Material |
|---|---|
| 56.7 | LF-0219A/ETS 9078 graft, from above |
| 3.6 | DFDA-1173 NT, 1% dibutyl tin dilaurate concentrate in LDPE (0.92 g/cm3, 2.0 mi), Union Carbide Corp. |
| 33.2 | 40% concentrate of Bayer ADC/F azodicarbonamide in LDPE (0.919 g/cm3, 2.0 MI) |
| 4.0 | 20% zinc stearate, 30% zinc oxide concentrate in high-pressure LDPE (7–8 MI) |
| 2.5 | White color concentrate, 50% titanium dioxide in high-pressure LDPE (7–8 MI) |

As described in Example 1A, the sheet was exposed to 190° F. moisture to effect the silanolysis cross-linking, and then passed through a thermostatically-controlled foaming oven. The resulting density was 2 pcf, with comparative properties as shown in Table I. The object cross-linked foam structure of Example 2, containing the essentially linear olefin copolymer of this invention, exhibited superior tensile strength and elongation, and a finer cell size in comparison to the LLDPE/LDPE foam article of this example.

EXAMPLE 3

This example illustrates the preparation of a 3 pcf density foam structure in accordance with the method of the present invention.

The essentially linear olefin copolymer silane-grafted composition of Example 1 was admixed with additional pellicular components and extruded on a sheet line with coat-hanger die and three-roll stack, as described in Example 1, and slit down into a continuous sheet 5" wide and 0.070" thick and having the following composition:

| pbw | Material |
|---|---|
| 68.1 | Exact ™ 4041/DPDA 6182 graft, from Example 1, above |
| 3.4 | DFDA-1173 NT, 1% dibutyl tin dilaurate concentrate in LDPE (0.92 g/cm3, 2.0 mi), Union Carbide Corp. |
| 22.3 | 40% concentrate of Bayer ADC/F azodicarbonamide in EEA-6182 |
| 3.7 | 20% zinc stearate, 30% zinc oxide concentrate in high-pressure LDPE (7–8 MI) |
| 2.5 | White color concentrate, 50% titanium dioxide in high-pressure LDPE (7–8 MI) |

As described in Example 1, the sheet was exposed to 150° F. and 95% relative humidity for 18 hours to effect the silanolysis cross-linking. Subsequently, the sheet was passed through a thermostatically-controlled foaming oven with infrared heaters to maintain a surface temperature of 700° F., but with supplementary makeup air at 750° F., whereupon the cross-linked sheet expanded to a width of 16.5"×0.350" thickness. The resulting density was 3.0 pcf, with additional properties as shown in Table I.

COMPARATIVE EXAMPLE 3A

A silane-grafted, pellicular composition was prepared using the same equipment and methods as described in Example 1A, but with a mixture of LDPE and LLDPE, according to the following composition:

| pbw | Material |
|---|---|
| 67 | LF-0219A, LDPE (0.919 g/cm3, 2.0 MI), Novacor Chemical Co. |
| 33 | ETS 9078, LLDPE (0.910 g/cm3, 2.5 MI), Union Carbide Corp. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The pellicular grafted composition was admixed with additional pellicular components and extruded on a sheet line with coat-hanger die and three-roll stack, as described in Example 1A, to give an extrudate with the following composition:

| pbw | Material |
|---|---|
| 59.6 | LF-0219A/ETS 9078 graft, from above |
| 9.0 | LF-0219A, LDPE (0.919 g/cm3, 2.0 MI), Novacor Chemical Co. |
| 3.5 | DFDA-1173 NT, 1% dibutyl tin dilaurate concentrate in LDPE (0.92 g/cm3, 2.0 mi), Union Carbide Corp. |
| 22.3 | 40% concentrate of Bayer ADC/F azodicarbonamide in LDPE (0.919 g/cm3, 2.0 MI) |
| 4.1 | 20% zinc stearate, 30% zinc oxide concentrate in high-pressure LDPE (7–8 MI) |
| 2.5 | White color concentrate, 50% titanium dioxide in high-pressure LDPE (7–8 MI) |

As described in Example 1A, the sheet was exposed to 190° F. moisture to effect the silanolysis cross-linking, and then passed through a thermostatically-controlled foaming oven. The resulting density was 3 pcf, with comparative properties as shown in Table I. The object cross-linked foam structure of Example 3, containing the essentially linear olefin copolymer of this invention, exhibited superior tensile strength, elongation, compression set and a finer cell size, in comparison to the LLDPE/LDPE foam article of this example.

EXAMPLE 4

This example illustrates the preparation of a 4 pcf density foam structure in accordance with the method of the present invention.

A silane-grafted, pellicular composition was prepared using the same equipment and methods as described in Example 1, and consisting primarily of a resin of the present invention along with polyethylene/ethyl acrylate (EEA) as a softener and a minor amount of a fluoroelastomer processing aid concentrate designated as SAX 7401. The composition consisted of the following ingredients:

| pbw | Material |
|---|---|
| 85 | Exact ™ 4041, Exxon Chemical Co. |
| 10 | DPDA 6182 (0.930 g/cm3, 1.5 MI), polyethylene/ethyl acrylate, 15% ethyl acrylate content, Union Carbide Corp. |
| 5 | SAX 7401, fluoroelastomer processing aid, Dupont Chemical Co. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The essentially linear olefin copolymer silane-grafted composition from above was admixed with additional pellicular components and extruded on a sheet line with coat-hanger die and three-roll stack, as described in Example 1, and slit down into a sheet of 8" width×0.041" thick, to give an extrudate of the following composition:

| pbw | Material |
|---|---|
| 72.0 | Exact ™ 4041/DPDA 6182/SAX 7401 graft, from above |
| 3.5 | DFDA-1173 NT, 1% dibutyl tin dilaurate concentrate in LDPE (0.92 g/cm3, 2.0 mi), Union Carbide Corp. |

-continued

| pbw | Material |
| --- | --- |
| 18.5 | 40% concentrate of Bayer ADC/F azodicarbonamide in EEA-6182 |
| 4.0 | 20% zinc stearate, 30% zinc oxide concentrate in high-pressure LDPE (7–8 MI) |
| 2.0 | Black color concentrate, 45% carbon black in high-pressure LDPE (7–8 MI) |

As described in Example 1, the sheet was exposed to 150° F. and 95% relative humidity for 16 hours to effect the silanolysis cross-linking. Subsequently, the sheet was passed through a thermostatically-controlled foaming oven with infrared heaters to maintain a surface temperature of 700° F., but with supplementary makeup air at 750° F., whereupon the cross-linked sheet expanded to a width of 21"×0.150" thickness. The resulting density was 4.1 pcf, with additional properties as shown in Table I.

COMPARATIVE EXAMPLE 4A

A silane-grafted, pellicular composition was prepared using the same equipment and methods as described in Example 1A, but with a mixture of LDPE and LLDPE, according to the following composition:

| pbw | Material |
| --- | --- |
| 67 | LF-0219A, LDPE (0.919 g/cm3, 2.0 MI), Novacor Chemical Co. |
| 33 | ETS 9078, LLDPE (0.910 g/cm3, 2.5 MI), Union Carbide Corp. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The pellicular grafted composition was admixed with additional pellicular components and extruded on a sheet line with coat-hanger die and three-roll stack, as described in Example 1A, to give an extrudate of the following composition:

| pbw | Material |
| --- | --- |
| 73.1 | LF-0219A/ETS 9078 graft, from above |
| 3.5 | DFDA-1173 NT, 1% dibutyl tin dilaurate concentrate in LDPE (0.92 g/cm3, 2.0 mi), Union Carbide Corp. |
| 15.2 | 40% concentrate of Bayer ADC/F azodicarbonamide in LDPE (0.919 g/cm3, 2.0 MI) |
| 6.0 | 20% zinc stearate, 30% zinc oxide concentrate in high-pressure LDPE (7–8 MI) |
| 2.0 | Black color concentrate, 45% carbon black in high-pressure LDPE (7–8 MI) |

As described in Example 1A, the sheet was exposed to 190° F. moisture to effect the silanolysis cross-linking, and then passed through a thermostatically-controlled foaming oven. The resulting density was 4 pcf, with comparative properties as shown in Table I. The object cross-linked foam structure of Example 4, containing the essentially linear olefin copolymer of this invention, exhibited superior tensile strength, elongation, and a finer cell size, in comparison to the LLDPE/LDPE foam article of this example.

EXAMPLE 5

This example illustrates the process dependency of the foam properties of materials made in accordance with the present invention.

Samples of the extruded and calendared sheet from Example 4 were stacked to a combined thickness of 0.75", placed into a mold and pressed for 67 minutes in a 200 Ton compression-molding press with platens thermostatically controlled at 300° F. The pressure was released, the press opened and the molded bun partially expanded in response to the decrease in pressure. Cross-linking was induced only by the effect of the residual moisture in the composition at the time of compression-molding. The resulting density was 3.2 pcf, with additional properties as shown in Table I. This object exhibited superior tensile strength, elongation, compression set and a finer cell size, in comparison to the 3 pcf density LLDPE/LDPE foam article of Example 3A. In comparison to the foam structure of Example 3, which was also a 3 pcf object of the present invention, certain properties were superior, indicating that foam properties of the present discovery are somewhat process dependent.

EXAMPLE 6

This example illustrates the preparation of a 3 pcf density foam structure based on polypropylene and the essentially linear olefin polymers of this invention.

A silane-grafted, pellicular composition was prepared using the same equipment and methods as described in Example 1, but at a temperature of 220° C., consisting primarily of a 3 MI polypropylene along with a 3 MI resin of the present invention, according to the following composition:

| pbw | Material |
| --- | --- |
| 70 | Exact ™ 4017, Exxon Chemical Co. |
| 30 | Escorene ™ PD 9272 (0.89 g/cm3, 3.1 MI), polypropylene, Exxon Chemical Co. |
| 0.5 | #CV4917, Vinyl trimethoxy silane, Huls America, Inc. |
| 0.025 | Vulcup-R, 2,2'-bis(tert-butylperoxy) diisopropyl benzene, Hercules Chemical Co. |

The essentially linear olefin copolymer silane-grafted composition from above was admixed with additional pellicular components, extruded on a sheet line with coat-hanger die and three-roll stack as described in Example 1, and slit down into a sheet 7" wide and 0.052" thick, to give a material of the following composition:

| pbw | Material |
| --- | --- |
| 72.0 | Exact ™ 4017/Escorene ™ PD 9272 graft, from above |
| 3.6 | DFDA-1173 NT, 1% dibutyl tin dilaurate concentrate in LDPE (0.92 g/cm3, 2.0 mi), Union Carbide Corp. |
| 23.8 | 40% concentrate of Bayer ADC/F azodicarbonamide in Exxact 4041 |

As described in Example 1, the sheet was exposed to 150° F. and 95% relative humidity for 32 hours to effect the silanolysis cross-linking. Subsequently, the sheet was passed through a thermostatically-controlled foaming oven with infrared heaters to maintain a surface temperature of 700° F., but with supplementary makeup air at 750° F., whereupon the cross-linked composition expanded to a width of 20" and a thickness of 0.190". The resulting density was 2.8 pcf, with additional properties as shown in Table I. Shown for comparison and reference therein is a competitive organic peroxide cross-linked foam product of 3 pcf density.

EXAMPLE 7

In this example, a 4 pcf density foam structure is prepared based on a silane-grafted composition of primarily LDPE along with a minor amount of the essentially linear olefin polymers of this invention.

A silane-grafted, pellicular composition was prepared using the same equipment and methods as described in Example 1, according to the following composition:

| pbw | Material |
| --- | --- |
| 30 | Exact ™ 4041, Exxon Chemical Co. |
| 70 | LF-0219A, LDPE (0.919 g/cm3, 2.0 MI), Novacor Chemical Co. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The silane-grafted composition containing the essentially linear olefin copolymer from above was admixed with additional pellicular components, extruded on a sheet line with coat-hanger die and three-roll stack as described in Example 1, and slit down into a sheet of 8" width and 0.041" thickness. The resulting sheet had the following composition:

| pbw | Material |
| --- | --- |
| 72.0 | Exact ™ 4017/Escorene PD 9272 graft, from above |
| 3.5 | DFDA-1173 NT, 1% dibutyl tin dilaurate concentrate in LDPE (0.92 g/cm3, 2.0 mi), Union Carbide Corp. |
| 18.5 | 40% concentrate of Bayer ADC/F azodicarbonamide in EEA-6182 |
| 4.0 | 20% zinc stearate, 30% zinc oxide concentrate in high-pressure LDPE (7–8 MI) |
| 2.0 | Black color concentrate, 45% carbon black in high-pressure LDPE (7–8 MI) |

As described in Example 1, the sheet was exposed to 150° F. and 95% relative humidity for 16 hours to effect the silanolysis cross-linking. Subsequently, the sheet was passed through a thermostatically-controlled foaming oven with infrared heaters to maintain a surface temperature of 700° F., but with supplementary makeup air at 750° F., whereupon the cross-linked composition expanded to a width of 21"× 0.150" thickness. The resulting density was 4.1 pcf, with additional properties as shown in Table I. Shown for comparison and reference therein is a competitive radiation cross-linked foam product of 4 pcf density, demonstrating the superiority of the object of this discovery toward the properties of tensile strength and elongation.

Examples 8–14 illustrate the preparation of articles through the use of compression-molding.

EXAMPLE 8

This example demonstrates the use of the essentially linear olefin copolymers to produce a press cured foam bun, using both chemical cross-linking (organic peroxide) as well as silane-grafting followed by exposure to moist heat to effect the silanol condensation and thus cross-linking. Process conditions, crosslinking sequencing, and expansion procedures were adjusted to optimize the preparation of the cross-linked foam structure of this art for the particular selection of method of crosslinking.

In this example, an organic peroxide cross-linking system was utilized with the olefin copolymer object of this invention by methods commonly employed for the production of crosslinked LDPE molded foam buns. The composition utilized comprised:

| pbw | Material |
| --- | --- |
| 100 | Exact ™ 4041, Exxon Chemical Co. |
| 10 | Azodicarbonamide, 10 micron particle size |
| 0.25 | Kadox 911C, zinc oxide, Zinc Corp. of America |
| 0.5 | dicumyl peroxide, 99% active |

The composition was mixed in an internal, high shear "Banbury" type mixer by fusing the mixture at approximately 240° F., which is below the decomposition temperature of the foaming agent. The resulting admixture was calendared and shaped into a preform so as to fill a 1.25" deep, rectangular mold cavity. The mold with preform therein was then held in a 200 ton compression molding press for 55 minutes at 305° F. Following release from the press, the resulting bun was further heated in a hot air oven for 40 minutes at 330° F. The resulting density was 2 pcf, with additional properties as shown in Table II. Internal voids and a tendency to over-crosslink and under-expand, symptomatic of LLDPE response similarly cured, were observed herein.

EXAMPLE 9

In this example, the olefin copolymer object of this invention was silane-grafted by methods described in Example 1 according to the following composition:

| pbw | Material |
| --- | --- |
| 100 | Exact ™ 4041, Exxon Chemical Co. |
| 0.4 | #CV4910, Vinyl triethoxy silane, Huls America, Inc. |
| 0.02 | Vulcup-R, 2,2'-bis(tert-butylperoxy) diisopropyl benzene, Hercules Chemical Co. |

Utilizing the above silane-grafted composition, the following was mixed in an internal, high shear "Banbury" type mixer by fusing the mixture at approximately 240° F., which is below the decomposition temperature of the foaming agent:

| pbw | Material |
| --- | --- |
| 100 | Exact ™ 4041/VTEOS-grafted resin, from above |
| 14 | Azodicarbonamide, 10 micron particle size |
| 0.3 | Kadox 911C, zinc oxide, Zinc Corp. of America |

| pbw | Material |
|---|---|
| 6.0 | DFDA-1173 NT, 1% dibutyl tin dilaurate concentrate in LDPE (0.92 g/cm3, 2.0 mi), Union Carbide Corp. |

The resulting admixture was calendared and shaped into a preform so as to fill a 1.25" deep, rectangular mold cavity. The preform was then exposed to 95% relative humidity conditions for sufficient time so as to effect the cross-linking. The preform was placed into the mold, and held in a 200 ton compression molding press for 75 minutes at 290° F. Following release from the press, the resulting bun was further heated in a hot air oven for 40 minutes at 330° F. The resulting density was 2 pcf, with additional properties as shown in Table II.

EXAMPLE 10

Herein, the silane-grafted and cross-linked preform of Example 9 was expanded without the pressing operation, i.e. "freely expanded", in an oven for 60 minutes at 330° F. The resulting density was 2.7 pcf, with additional properties as shown in Table II.

EXAMPLE 11

In this example, an organic peroxide cross-linking system was utilized with the olefin copolymer object of this invention in a blended composition with ethylene vinyl acetate (EVA), ethylene methyl acrylate (EMA) and ethylene/propylene diene monomer terpolymer (EPDM), comprising:

| pbw | Material |
|---|---|
| 30 | Exact ™ 4041, Exxon Chemical Co. |
| 5 | AT-1070, EVA, 9% vinyl acetate content, AT Plastics, Inc. |
| 30 | AT-1710, EVA, 17% vinyl acetate content, AT Plastics, Inc. |
| 30 | XV 53-04, EMA, 15% methyl acrylate content, 0.7 M.I., Exxon Chemical Company |
| 5 | Nordel 1440, EPDM, 45 Mooney viscosity, 55% ethylene content, 5% diene content, Dupont, Inc |
| 10 | Azodicarbonamide, 10 micron particle size |
| 0.11 | Kadox 911C, zinc oxide, Zinc Corp. of America |
| 0.9 | dicumyl peroxide, 99% active |
| 0.05 | Irganox 1010, antioxidant, Ciba Geigy Corp. |

The composition was mixed as described in Example 8 and similarly calendared and shaped. The mold with preform therein was then held in a 200 ton compression molding press for 60 minutes at 290° F. Following release from the press, the resulting bun was further heated in a hot air oven for 60 minutes at 330° F. The resulting density was 1.5 pcf, with additional properties as shown in Table II.

EXAMPLE 12

In this example, an organic peroxide cross-linking system was utilized with a lower specific gravity version of the olefin copolymer object of this invention in a blended composition with ethylene vinyl acetate (EVA) and ethylene/propylene diene monomer terpolymer (EPDM), comprising:

| pbw | Material |
|---|---|
| 50 | Exact ™ 5008, Exxon Chemical Co. |
| 10 | AT-2306, EVA, 23% vinyl acetate content, AT Plastics, Inc. |
| 30 | AT-2803-A, EVA, 28% vinyl acetate content, AT Plastics, Inc. |
| 10 | Nordel 1440, EPDM, 45 Mooney viscosity, 55% ethylene content, 5% diene content, Dupont, Inc. |
| 14 | Azodicarbonamide, 10 micron particle size |
| 0.2 | Kadox 911C, zinc oxide, Zinc Corp. of America |
| 1.0 | dicumyl peroxide, 99% active |
| 0.5 | Irganox 1010, antioxidant, Ciba Geigy Corp. |
| 0.6 | Silicone oil |
| 0.4 | Coagent |
| 20 | Calcium Carbonate |

The composition was mixed as described in Example 8 and similarly calendared and shaped. The mold with preform therein was then held in a 200 ton compression molding press for 60 minutes at 290° F. Following release from the press, the resulting bun was further heated in a hot air oven for 60 minutes at 330° F. The resulting density was 2 pcf, with additional properties as shown in Table II.

COMPARATIVE EXAMPLE 13

In this example, an organic peroxide cross-linking system was utilized with LDPE, by methods commonly employed for the production of crosslinked LDPE molded foam buns. The composition comprised the following ingredients:

| pbw | Material |
|---|---|
| 100 | Dowlex 510, LDPE (0.919 g/cc, 2.0 MI), Dow Chemical Co. |
| 14.4 | Azodicarbonamide, 10 micron particle size |
| 0.25 | Kadox 911C, zinc oxide, Zinc Corp. of America |
| 0.52 | dicumyl peroxide, 99% active |
| 0.53 | Paraffinic oil |

The composition was mixed as described in Example 8 and similarly calendared and shaped. The mold with preform therein was then held in a 200 ton compression molding press for 40 minutes at 310° F. Following release from the press, the resulting bun was further heated in a hot air oven for 25 minutes at 320° F. The resulting density was 2 pcf, with additional properties as shown in Table II.

COMPARATIVE EXAMPLE 14

Herein, an organic peroxide cross-linking system was utilized with EVA, by methods commonly employed for the production of crosslinked EVA molded foam buns. The composition comprised the following ingredients:

| pbw | Material |
|---|---|
| 100 | Dowlex 510, LDPE (0.919 g/cc, 2.0 MI), Dow Chemical Co. |
| 14.4 | Azodicarbonamide 10 micron particle size |
| 0.25 | Kadox 911C, zinc oxide, Zinc Corp. of America |

-continued

| pbw | Material |
|---|---|
| 0.52 | dicumyl peroxide, 99% active |
| 0.53 | Paraffinic oil |

The composition was mixed at a fusion temperature of 225° F. as described in Example 8 and similarly calendared and shaped. The mold with preform therein was then held in a 200 ton compression molding press for 40 minutes at 295° F. Following release from the press, the resulting bun was further heated in a hot air oven for 25 minutes at 320° F. The resulting density was 2.1 pcf, with additional properties as shown in Table II.

TABLE I

COMPARATIVE PROPERTIES OF CONTINUOUS PROCESS EXAMPLES

| | EXAMPLE 1 | EXAMPLE 1A | EXAMPLE 2 | EXAMPLE 2A | EXAMPLE 3 | EXAMPLE 3A | EXAMPLE 4 | EXAMPLE 4A |
|---|---|---|---|---|---|---|---|---|
| DENSITY (pcf) | 6 | 6 | 2.2 | 2 | 3 | 3 | 4.1 | 4 |
| TENSILE STRENGTH (psi) | 235 | 154 | 77 | 40 | 113 | 53 | 132 | 91 |
| ELONGATION (%) | 562 | 350 | 474 | 235 | 533 | 360 | 475 | 345 |
| TEAR STRENGTH (pli) | 29.3 | 38 | 11.6 | 11.6 | 18.1 | 14.5 | 22.3 | 26.5 |
| COMPRESSION RESISTANCE (psi) AT 25% | 10.9 | 17 | 3.3 | 4.9 | 4.6 | 5.1 | 5.7 | 8.9 |
| COMPRESSION SET, 50% (%) COMPR. | 9 | 15 | 32.8 | 30 | 17.6 | 25 | 20 | 20 |
| CELL SIZE MODE (mm.) | 0.1 | 0.3 | 0.2 | 0.4 | 0.2 | 0.4 | 0.2 | 0.3 |
| THERMAL STABILITY (%) SHRINKAGE 3 HRS @ 250 F. | | | | | | | | |

| | EXAMPLE 5 FREE EXPANDED | EXAMPLE 5 PRESS EXPANDED | EXAMPLE 6 | EXAMPLE 3A | 3 PCF XLPE TORAY | EXAMPLE 7 | 4PCF RADIA-TION XL FOAM VOLTEK (Volara #4A) |
|---|---|---|---|---|---|---|---|
| DENSITY | 4.1 | 3.2 | 2.8 | 3 | 3 | 4.1 | 4 |
| TENSILE STRENGTH | 132 | 116 | 94 | 53 | 132 | 108 | |
| ELONGATION | 475 | 460 | 405 | 360 | 124 | 475 | 162 |
| TEAR STRENGTH | 22.3 | 17.6 | 14.5 | 235 | 22.3 | 20 | |
| COMPRESSION RESISTANCE AT 25% | 5.7 | 5 | 5.1 | 5.7 | 10 | | |
| COMPRESSION SET, 50% COMPR. | 20 | 14.5 | 25 | 20 | 16 | | |
| CELL SIZE MODE | 0.2 | 0.15 | 0.4 | 0.2 | ND | | |
| THERMAL STABILITY, SHRINKAGE 3 HRS @ 250 F. | | | 31.3 | 1.9 | | | |

TABLE II

COMPARATIVE PROPERTIES OF MOLDED BUN EXAMPLES

| | Comparative: | | | | | | |
|---|---|---|---|---|---|---|---|
| Formulation: | 8 | 9 | 10 | 11 | 12 | 13 | 14 |
| Density, (pcf) | 2 | 2.09 | 2.66 | 1.5 | 2.0 | 2.06 | 2.1 |
| Tensile Strength, (psi) | ND | 55 | ND | 35 | 75 | 50 | 61 |
| Ultimate Elongation, (%) | ND | 440 | ND | 280 | 260 | 180 | 370 |
| 25% CD, (psi) | ND | 3.4 | ND | 2.3 | 2.3 | 10 | 5.1 |
| 50% CS, (%) | ND | 30 | ND | 35 | 35 | 20 | 16 |
| Cell Size Mode (mm) | Collapsed[a] | 0.5[b] | 1.0[b] | 0.1 | 0.2 | 0.14 | 0.15 |

[a] poor quality foam
[b] with some 1.5 mm cells

What is claimed is:

1. A method of making a foamed polymer article comprising the steps of:

providing a mixture including a silane-grafted metallocene catalyzed polyolfin resin and a foaming agent, where the metallocene catalyzed polyolefin resin is a polyethylene, a copolymer of ethylene and a C3–C20 alpha-olefin, a polypropylene, or a copolymer of ethylene, a C3–C20 alpha-olefin and a C4–C20 diene, the metallocene catalyzed polyolefin resin has a density below about 0.96 g cm$^{-3}$, a molecular weight distribution between about 1.5 and about 3.5, a melt index in the range of about 0.5 dg/min to about 100 dg/min, and a composition distribution breadth index greater than about 45 percent, and the silane includes a silane having a hydrolyzable group;

cross-linking the resin of the mixture to form a cross-linked mixture; and expanding the cross-linked mixture into a foamed article.

2. The method of claim 1, wherein the mixture is a silane cross-linkable polymer blend.

3. The method of claim 1, wherein the providing step includes the step of blending the metallocene catalyzed polyolefin resin with a low density polyethylene, a linear low density polyethylene, a medium density polyethylene, a high density polyethylene, a polypropylene, an ethylene-propylene rubber, an ethylene-propylene-diene terpolymer, an ethylene-vinyl acetate copolymer, an ethylene-maleic anhydride copolymer, or an ethylene-ethyl acetate copolymer.

4. The method of claim 3, wherein the providing step includes the step of silane-grafting a portion of the mixture.

5. The method of claim 4, wherein the silane includes a vinyl silane having 2 or 3 hydrolyzable groups.

6. The method of claim 5, wherein the silane includes vinyl trimethoxysilane.

7. The method of claim 6, wherein the silane includes vinyl triethoxysilane.

8. The method of claim 1, further comprising the step of partially cross-linking the polymer blend prior to the expanding step.

9. The method of claim 1, wherein the step of cross-linking the polymer blend includes exposing the polymer mixture to moisture.

10. The method of claim 1, further comprising the step extruding the polymer mixture.

11. The method of claim 9, wherein the step of cross-linking the polymer blend further includes reacting the polymer blend with a peroxide.

12. The method of claim 1, wherein the step of expanding the polymer blend comprises compression molding the polymer mixture at increased temperature and pressure.

13. A foamed polyolefin article comprising a silane-grafted metallocene catalyzed polyolefin resin having a silane-graft content of up to 6 percent, wherein the metallocene catalyzed polyolefin resin has a density below about 0.96 g cm$^{-3}$, a molecular weight distribution between about 1.5 and about 3.5, a melt index in the range of about 0.5 dg/min to about 100 dg/min, and a composition distribution breadth index greater than about 45 percent, and the silane comprises a silane having a hydrolyzable group.

14. The foamed polyolefin article of claim 13, comprising a partially cross-linked polymer blend, the polymer blend including the metallocene catalyzed polyolefin resin.

15. The foamed polyolefin article of claim 14, wherein the metallocene catalyzed polyolefin resin is a polyethylene, a copolymer of ethylene and a C3–C20 alpha-olefin, a polypropylene, or a copolymer of ethylene, a C3–C20 alpha-olefin and a C4–C20 diene.

16. The foamed polyolefin article of claim 13, wherein the article has a gel content of between 5 and 95 percent.

17. The foamed polyolefin article of claim 14, wherein the polymer blend comprises greater than 5 percent of the metallocene catalyzed polyolefin resin.

18. The foamed polyolefin article of claim 17, wherein the silane includes a vinyl silane having 2 or 3 hydrolyzable groups.

19. The foamed polymer article of claim 18, wherein the polymer blend comprises between about 5 and 100 weight percent of the metallocene catalyzed polyolefin.

20. The foamed polyolefin article of claim 18, wherein the silane includes vinyl trimethoxysilane.

21. The foamed polyolefin article of claim 18, wherein the silane includes or vinyl triethoxysilane.

22. The foamed polyolefin article of claim 20, wherein the polymer blend further comprises a low density polyethylene, a linear low density polyethylene, a medium density polyethylene, a high density polyethylene, a polypropylene, an ethylene-propylene rubber, an ethylene-propylene-diene terpolymer, an ethylene-vinyl acetate copolymer, an ethylene-maleic anhydride copolymer, or an ethylene-ethyl acetate copolymer.

23. The foamed polyolefin article of claim 14, wherein the polymer blend is partially silane-grafted.

24. The foamed polyolefin article of claim 20, further comprising a cell nucleating agent and a gas exchange additive.

25. The foamed polyolefin article of claim 20, wherein the foamed polyolefin article is in the form of a sheet, plank, laminated plank, bead, or extruded profile.

26. The foamed polyolefin article of claim 13, wherein the foamed polyolefin article has an average foam density between 0.7 and 22 pounds per cubic foot.

27. The method of claim 1, wherein the metallocene catalyzed polyolefin resin is a copolymer of ethylene with a styrene.

28. The method of claim 1, wherein the providing step includes the step of blending the metallocene catalyzed polyolefin resin with a polystyrene.

29. The foamed polyolefin article of claim 13, wherein the metallocene catalyzed polyolefin resin is a copolymer of ethylene with a styrene.

30. The method of claim 14, wherein the polymer blend further comprises a polystyrene.

31. The method of claim 1, wherein the metallocene catalyzed polyolefin resin is a metallocene catalyzed polyethylene.

32. The method of claim 13, wherein the metallocene catalyzed polyolefin resin is a metallocene catalyzed polyethylene.

* * * * *